Figure 1:
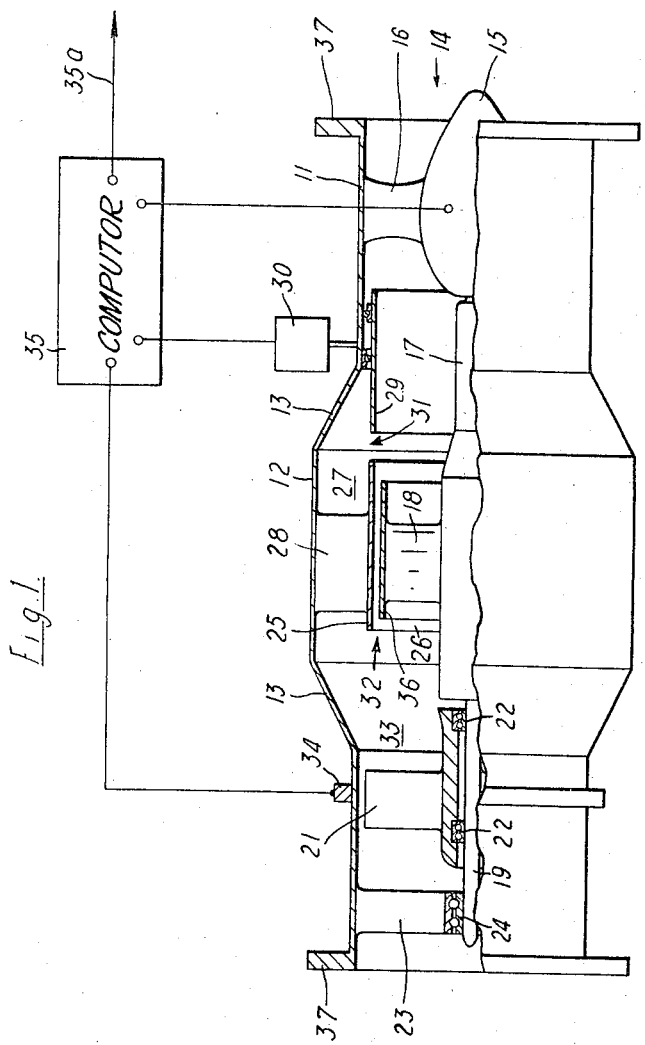

INVENTOR
ROBERT MAURER
BY
Bacon & Thomas ATTORNEYS

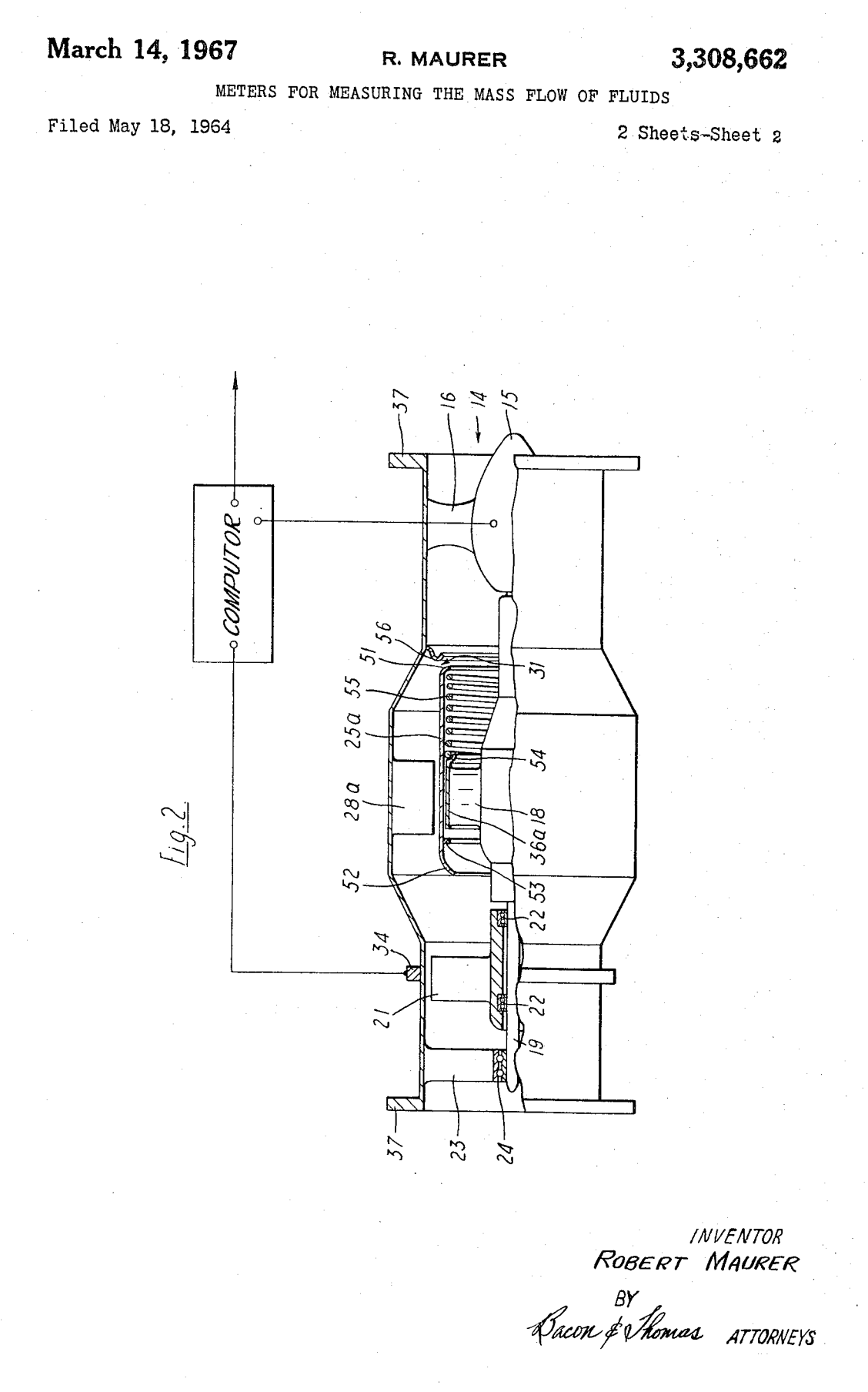

March 14, 1967  R. MAURER  3,308,662
METERS FOR MEASURING THE MASS FLOW OF FLUIDS
Filed May 18, 1964  2 Sheets-Sheet 2

INVENTOR
ROBERT MAURER
BY
Bacon & Thomas ATTORNEYS

United States Patent Office 3,308,662
Patented Mar. 14, 1967

3,308,662
METERS FOR MEASURING THE MASS FLOW OF FLUIDS
Robert Maurer, 69 Torbay Road, Rayners Lane,
Harrow, Middlesex, England
Filed May 18, 1964, Ser. No. 368,135
Claims priority, application Great Britain, May 25, 1963,
20,957/63
12 Claims. (Cl. 73—231)

This invention relates to meters for measuring the mass flow of fluids.

Such meters are known in which the fluid is caused to flow through an annular passage and has imparted thereto a swirl (i.e. a rotational component of flow), the reaction of the swirling liquid on reaction vanes (T) is measured and subsequently the rotational speed (V) of the liquid. Signals corresponding to these two measurements are fed into a computer which calculates the mass (M) of liquid flowing per unit time by dividing the reaction by the rotational speed of the liquid.

The swirl may be imparted to the liquid by a motor driven rotor or by inclined vanes. In the case of the inclined vanes, as the mass flow of the liquid and hence the linear speed of the liquid increases, both the reaction and the rotational speed of the liquid will increase considerably and therefore the range within which the meter is accurate is limited.

An object of the invention is to provide a mass flow meter which is accurate over a wide range.

According to the invention there is provided a meter for measuring the mass flow of fluid comprising reaction means for imparting a swirl to the fluid, means for measuring the torsional reaction of the fluid on the reaction means and a paddle or like means for measuring the rotational speed of the fluid characterised by a bypass passage for enabling some of the fluid to bypass the reaction vanes and leading the bypass fluid to join fluid passing from the reaction vanes upstream of the speed paddle. The bypass passage preferably contains guide vanes.

A variable orifice valve is preferably provided for varying the amount of fluid flow through the bypass passage relative to the flow through the reaction vanes. The valve may be adjusted by a servo or like mechanism or by the reaction of the fluid on a member attached to the valve or by other means.

Two embodiments of the invention will now be described by way of example with reference to the accompanying diagrammatic drawing, in which:

FIGURE 1 is an elevation partly in axial section through a meter of the invention for use with fluid, and FIGURE 2 is a view similar to FIGURE 1 of a modified meter.

Referring now to FIGURE 1, the meter comprises a hollow circular section housing 11. The housing has an enlarged central portion 12 with smoothly inclined lead-in and outlet portions 13. Centrally located within the housing 11 at one end 14 thereof (the inlet or upstream end) is a torque-meter 15 which is supported by struts 16 which also serve to guide the fluid stream in a substantially axial direction. The torque meter 15 has a streamlined casing. A shaft 17 connected to the torque meter 15 carries about it a number of helical guide vanes 18 within the central portion 12 for imparting a swirl to the fluid. The shaft 17 has a smaller diameter extension 19 which carries a freely rotatable speed paddle 21 on bearings 22 and which is supported at its free end by struts 23 through the intermediary of bearings 24. The speed paddle has axial or substantially axial vanes. The guide vanes 18 and speed paddle 21 are preferably of the same density of the fluid being measured.

At the central portion 12 there is provided an axially extending cylindrical sleeve 25 which surrounds the helical guide vanes 18 to divide the interior of the housing into inner and outer annular chambers 26 and 27 respectively, those chambers defining first and second flow paths for fluid. The sleeve 25 is supported by a plurality of axial or substantially axial guide vanes 28 extending from the housing 11. A cylindrical valve member 29 is carried within the housing 11 and is movable by a servo motor 30 through a rack and pinion device (not shown) to vary the by-pass inlet 31 to the outer chamber 27 (from zero to a maximum) as the flow through the meter increases from a minimum to a maximum. The space between outlet 32 of the outer chamber 27 and the speed paddle 21 constitutes a mixing chamber 33 which is of a sufficient length to enable liquids passing from the chambers 26 and 27 to mix but not so long that there are looses due to the resistance of the sides of the housing 11.

A conventional or any other type of speed pick off 34 is provided to measure the speed of rotation of the speed paddle 21. The output of this pick off 34 is led to a computer shown diagrammatically at 35 as is the output of the torque meter 15. The output 35a of the computer 35 gives the mass flow through the meter and may be connected to a totaliser (not shown) if required. The helical guide vanes are provided with a shroud 36 which is of slightly less diameter than the diameter of the sleeve 25 and there is some fluid flow between the shroud and the sleeve 25.

Flanges 37 are provided at the ends of the housing to enable the meter to be connected into an hydraulic circuit.

In use, the stream of liquid entering the meter is caused to divide into inner and outer streams flowing along first and second paths, that is, through the inner and outer chambers 26 and 27, respectively. The helical guide vanes 18 impart a swirl to the inner stream. The reaction (T) of this stream on the helical guide vanes 18 is measured by the torque meter 15. The two streams then meet and mix in the mixing chamber 33. The combined streams then rotate the speed paddle 21 at their mean swirl velocity (V). The speed pick off 34 measures the speed of rotation of the paddle 21.

The outputs of the torque meter 15 and the speed pick off 34 are fed into the computor 35 which computes the mass flow from the following considerations. As the mixing chamber 33 is short, the rotational momentum of the fluid at the paddles is the same as that imparted to the inner stream by the helical guide vanes 18. Thus:

$$m_1 v_1 = MV$$

where $m_1$ = mass flow of the inner stream
$v_1$ = rotational velocity of the inner stream
$M$ = total mass flow through the meter
$V$ = mean rotational speed of speed paddle But as $m_1 v_1 = T/K$ where $T$ = torque and $K$ = a constant
$T = KMV$ and $M = T/KV$ The computer 35 is also connected to control the servo motor 30 so that as the total mass flow through the meter increases, the valve 29 will be moved to increase the size of inlet 31 and hence the amount of relative flow through the outer chamber 27. The valve 29 may be operated so that the momentum acting on the vanes 18 and the rotational speed of paddles 21 vary in a predetermined relationship e.g. $T \alpha \sqrt{M}$ and $V \alpha 1/\sqrt{M}$.

It is to be noted that any friction between the speed paddles 21 and the shaft extension 19 will act in the opposite direction to the reaction on the vanes 18. This will thus produce a compensating decrease in torque measured by the torque meter 15 which balances or minimizes the effect of the paddle speed loss due to friction. The meter will therefore continue to give accurate results.

It is seen that the outer chamber 27 forms a by-pass for enabling a portion of the liquid to by-pass the helical guide vanes 18 (but not the speed paddle 31).

The meter shown in FIGURE 2 is identical to that shown in FIGURE 1 save for the construction and operation of the valve. In this embodiment the sleeve 25a (but not vanes 28a) is axially movable and is provided with lips 51 and 52 at its front and rear ends. A further inwardly projecting rim 53 is provided slightly downstream of the helical guide vanes 18. The shroud 36a of the vanes 18 has a lip 54 at its forward edge. A helical compression spring 55 extends between the lips 54 and 51 urging the sleeve 25a towards a projection 56 to vary the inlet 31 to the outer chamber 27. The sleeve 25a thus acts as the valve. The strength of the spring 55 is such that the inlet 31 is closed at minimum mass flow through the meter and is at a maximum at maximum flow. The liquid drag on the lips 51, 52 and 53 urges the sleeve 25a to open inlet 31.

The invention is not limited to the precise details herein described and shown in the drawings. For example instead of an annular by-pass chamber, the by-pass could be in the form of one or more discrete passages or ducts having appropriate control valve means therein. The meters could also be used with fluids other than liquids. Trimming vanes may be incorporated on one or both sides of the axial guide vanes to smooth the fluid flow. The proportions of a fluid flow through the helical reaction vanes and the by-pass may be varied by a valve which limits flow through the helical reaction vanes. This valve may be adapted to increase the inlet opening of the by-pass at the same time as decreasing the flow to the reaction vanes and vice versa. The guide vanes 28 may be inclined and at the same or opposite hand to the reaction vanes 18. The speed paddles should then be of the same inclination and hand.

I claim:

1. A meter for measuring the mass flow of a stream of fluid therethrough, comprising; means directing a portion of said stream along a first path; means for imparting a swirl to the fluid in said first path; means directing the remainder of said stream along a second path, bypassing said first path; means defining a mixing chamber, said first and second paths both discharging into said mixing chamber; an outlet leading from said mixing chamber; speed measuring means adjacent said outlet for measuring the total swirl velocity of the entire fluid stream entering said outlet; and means for measuring the torsional reaction of said fluid whereby the total mass flow may be calculated from said speed and reaction measurements.

2. A meter as defined in claim 1 including fluid guiding vanes in said second path.

3. A meter as defined in claim 2 wherein said guiding vanes extend axially of said second path.

4. A meter as defined in claim 2 wherein said speed measuring means includes inclined vanes; said guiding vanes being inclined at the same angle as the vanes on said speed measuring means.

5. A meter as defined in claim 1 including variable valve means for regulating the proportions of said stream directed into said first and second paths.

6. A meter as defined in claim 5 wherein said valve means is arranged to direct a greater portion of said stream to said second path upon opening movement thereof; means biasing said valve means toward its closed position; and means responsive to the frictional drag of fluid flowing through said meter, for urging said valve means toward open position.

7. A meter as defined in claim 1 wherein said means for imparting swirl to the fluid is mounted on a member extending along and in said first path and through said mixing chamber; said speed measuring means being rotatably mounted on said member.

8. A meter as defined in claim 1 wherein said first and second paths are annular and substantially concentric, said second path being defined by an annular chamber surrounding said first path.

9. A meter as defined in claim 1 wherein said second path is defined by at least one discrete duct.

10. A meter as defined in claim 1 wherein said means for measuring the torsional reaction of said swirling fluid and said speed measuring means each produce an output signal; a computer device; and means for feeding said output signals to said computer whereby said computer calculates the mass flow of fluid through said meter.

11. A meter as defined in claim 10 including variable valve means for regulating the proportions of said stream directed to said first and second paths; said valve means being controlled by said computer.

12. A meter as defined in claim 1 wherein said means for measuring the torsional reaction of said swirling fluid is responsive to the torsional forces acting on said means for imparting swirl to said fluid.

References Cited by the Examiner
UNITED STATES PATENTS

| | | | |
|---|---|---|---|
| 2,293,478 | 8/1942 | Stevenson | 73—203 |
| 2,747,403 | 5/1956 | Stevenson | 73—203 |
| 2,842,963 | 7/1958 | Ardley | 73—231 |
| 3,043,139 | 7/1962 | Waugh et al. | 73—194 |

RICHARD C. QUEISSER, *Primary Examiner.*

E. D. GILHOOLY, *Assistant Examiner.*